(12) United States Patent
Higley et al.

(10) Patent No.: US 11,815,724 B1
(45) Date of Patent: Nov. 14, 2023

(54) FLEXIBLE PUSH-PULL BOOT AND CRIMP BODY FOR FIBER OPTIC CONNECTOR

(71) Applicant: US Conec, Ltd, Hickory, NC (US)

(72) Inventors: Jason Higley, Hickory, NC (US); Mitchell Cloud, Hickory, NC (US)

(73) Assignee: US CONEC, LTD., Hickory, NC (US)

( * ) Notice: Subject to any disclaimer, the term of this patent is extended or adjusted under 35 U.S.C. 154(b) by 0 days.

(21) Appl. No.: 18/221,331

(22) Filed: Jul. 12, 2023

Related U.S. Application Data

(63) Continuation of application No. 17/045,068, filed as application No. PCT/US2019/025944 on Apr. 5, 2019, now Pat. No. 11,719,893.

(60) Provisional application No. 62/793,198, filed on Jan. 16, 2019, provisional application No. 62/653,706, filed on Apr. 6, 2018.

(51) Int. Cl.
*G02B 6/36* (2006.01)
*G02B 6/38* (2006.01)

(52) U.S. Cl.
CPC ......... *G02B 6/3888* (2021.05); *G02B 6/3825* (2013.01); *G02B 6/3893* (2013.01); *G02B 6/38875* (2021.05)

(58) Field of Classification Search
CPC ................ G02B 6/3888; G02B 6/3825; G02B 6/38875; G02B 6/3893; G02B 6/36
See application file for complete search history.

(56) References Cited

U.S. PATENT DOCUMENTS

| | | | |
|---|---|---|---|
| 8,556,645 B2 * | 10/2013 | Crain | H01R 13/633 438/258 |
| 9,595,786 B1 * | 3/2017 | Takano | G02B 6/3893 |
| 10,656,345 B2 * | 5/2020 | Crawford | G02B 6/3893 |

* cited by examiner

*Primary Examiner* — Jennifer Doan
(74) *Attorney, Agent, or Firm* — Troutman Pepper Hamilton Sanders LLP (Rochester)

(57) ABSTRACT

A new boot for a fiber optic connector has a ribbed back portion, a center portion, and a forward extending portion that can be used to insert and remove the fiber optic connector to receptacle. The ribbed back portion has grasping elements and is connected to the center portion. The center portion is removably connected to a crimp body that is in turn connected to the connector housing. The front extension is connected to the fiber optic connector and also provides a keying feature depending on the side of the fiber optic connector on which it is installed.

20 Claims, 15 Drawing Sheets

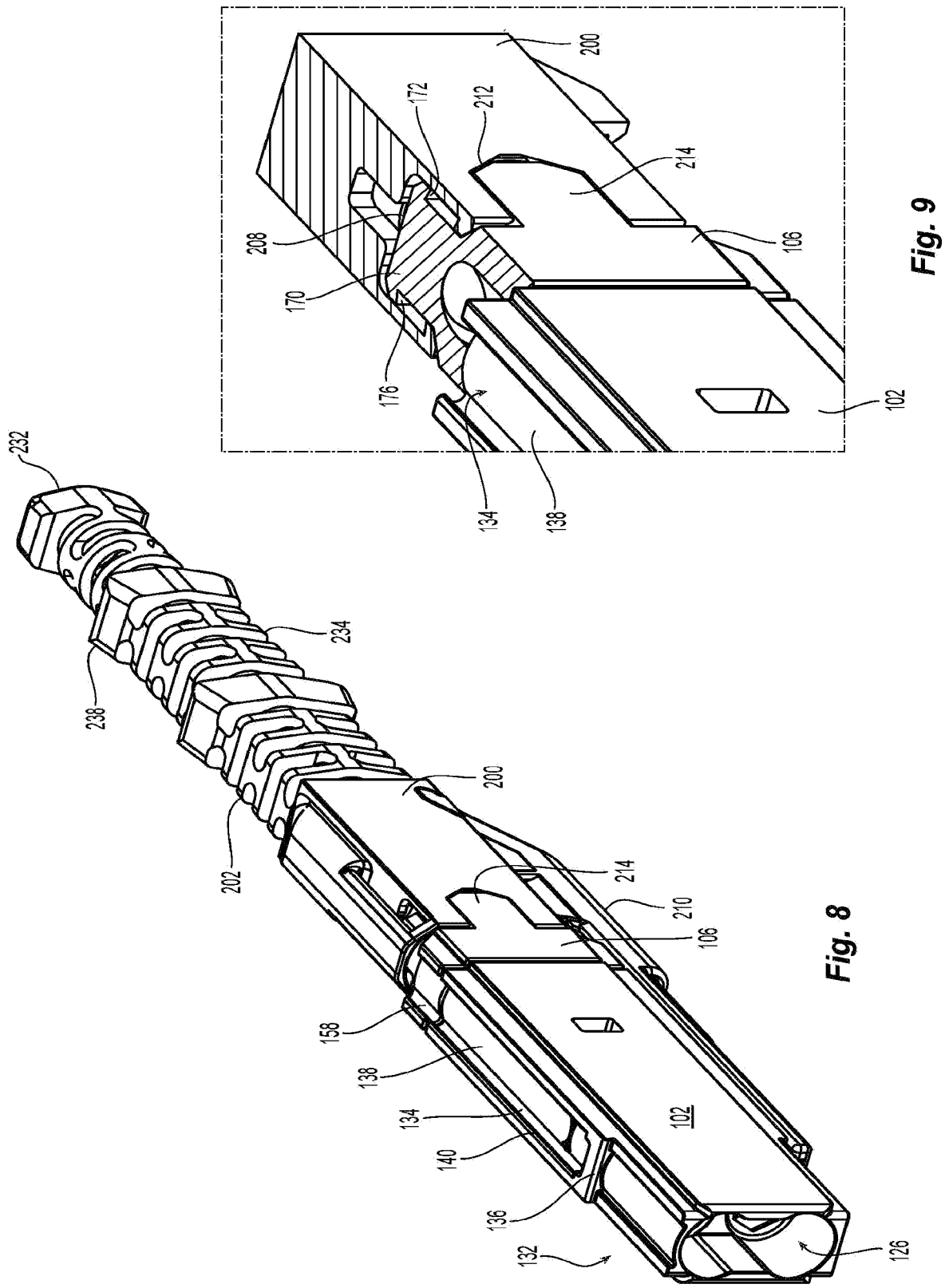

FLEXIBLE PUSH-PULL BOOT AND CRIMP BODY FOR FIBER OPTIC CONNECTOR

CROSS-REFERENCE TO RELATED APPLICATION

This application is a continuation of U.S. patent application Ser. No. 17/045,068, filed Oct. 2, 2020, which is based on a national state application under 35 U.S.C. § 371 of PCT Application No. PCT/US2019/025944, filed Apr. 5, 2019, which claims the benefit of U.S. Provisional Application No. 62/793,198, filed Jan. 16, 2019, and U.S. Provisional Application No. 62/653,706, filed Apr. 6, 2019, each of which are hereby incorporated by reference in their entirety.

FIELD OF THE INVENTION

Fiber optic connectors, and the locations where they are installed, are becoming smaller, requiring a higher density application. The fiber optic connectors have been reduced in size such that a person can not easily grasp individual fiber optic connectors mounted in a receptacle in the high density areas. Thus, it can be very difficult to install a fiber optic connector in, and uninstall from, its respective receptacle. Adjacent fiber optic connectors are generally located too close to allow manual insertion and removal of a single fiber optic connector using the connector's outer housing as intended, particularly, when used in higher density applications. Some solutions to the smaller areas include push-pull tabs or projections connected to the fiber optic connector, either as an additional component or as an integral part of the fiber optic connector, usually the outer housing.

While these push-pull tabs provide a solution to the insertion and removal of some fiber optic connectors, there is still an issue with the optical fibers and optical cables getting tangled around the tabs. This could lead to the push-pull tabs being removed or broken, providing the user with no real options for removing the fiber optic connectors. Additionally, in a high density environment, there may be some confusion as to which fiber optic connector a particular push-pull tab belongs.

While a boot may be used for pushing a fiber optic connector into a receptacle, they are generally not intended to be used to remove a fiber optic connector. The boot is generally used for strain relief of the optical fibers secured within the fiber optic connectors. In many connectors, the boot simply cannot be used for fiber optic connector removal as the boot is not attached to the appropriate structures, such as the outer housing.

Additionally, the typical boot on a fiber optic connector can not convey the polarity of the fiber optic connector to which it is attached.

The present invention is therefore directed to a boot that can be used with a fiber optic connector to insert into and remove from a receptacle. The boot can also be detached from a portion of the fiber optic connector and reinstalled in a different configuration to identify a polarity of the fiber optic connector.

SUMMARY OF THE INVENTION

The present invention is directed to a boot for a fiber optic connector, the fiber optic connector having a housing, at least two fiber optic ferrules, and a crimp body, the boot that includes a center portion having a front end and a back end, a first longitudinal opening extending between the front end and the back end to receive a portion of the crimp body and a fiber optic cable, a back portion attached to the center portion and extending away from the front end of the center portion, the back portion defining a second longitudinal opening that is in communication with the first longitudinal opening, the back portion having grasping portions to allow a user to push and pull on the boot, and a front extension portion connected to the center portion and engageable with the fiber optic connector, the front extension portion extending forward and beyond the front end of the center portion and having at least one latch to engage a receptacle.

In some embodiments, the the boot is connectable to one of a first side and a second side of the fiber optic connector to determine a polarity of the fiber optic connector.

In some embodiments, the boot further includes a first engagement member to cooperate with a corresponding second engagement member on the crimp body to removably attach the boot to the crimp body.

In some embodiments, pulling on the boot causes the first engagement member to slide relative to the second engagement member thereby pulling the front extension rearwardly releasing the fiber optic connector from the receptacle.

In another aspect, the invention is directed to a combination of a boot and a crimp body for a fiber optic connector, the fiber optic connector having a housing, at least two fiber optic ferrules, and a spring push, the combination that includes a boot that further includes a center portion having a front end and a back end, a first longitudinal opening extending between the front end and the back end to receive a portion of the crimp body and a fiber optic cable, a back portion attached to the center portion and extending away from the front end of the center portion, the back portion defining a second longitudinal opening that is in communication with the first longitudinal opening, the back portion having grasping portions to allow a user to push and pull on the boot, a front extension portion connected to the center portion and engageable with the fiber optic connector, the front extension portion extending forward and beyond the front end of the center portion and having at least one latch to engage a receptacle, and a crimp body that additionally includes a front portion configured to be disposed at least partially in the housing, a rear portion that extends rearwardly away from the front portion and provides an outer surface to receive a crimp band therearound, and a central portion disposed between the front and rear portions, wherein the boot has a first engagement member to cooperate with a corresponding second engagement member on the crimp body to removably attach the boot to the crimp body, the second engagement member being disposed on the central portion of the crimp body.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 8 is bottom perspective view of the front extension, crimp body, and boot from the fiber optic connector in FIG. 1;

FIG. 9 is a partial cross section of the crimp body and boot at the connection of these two components;

DETAILED DESCRIPTION OF THE PREFERRED EMBODIMENTS

Figure 1:
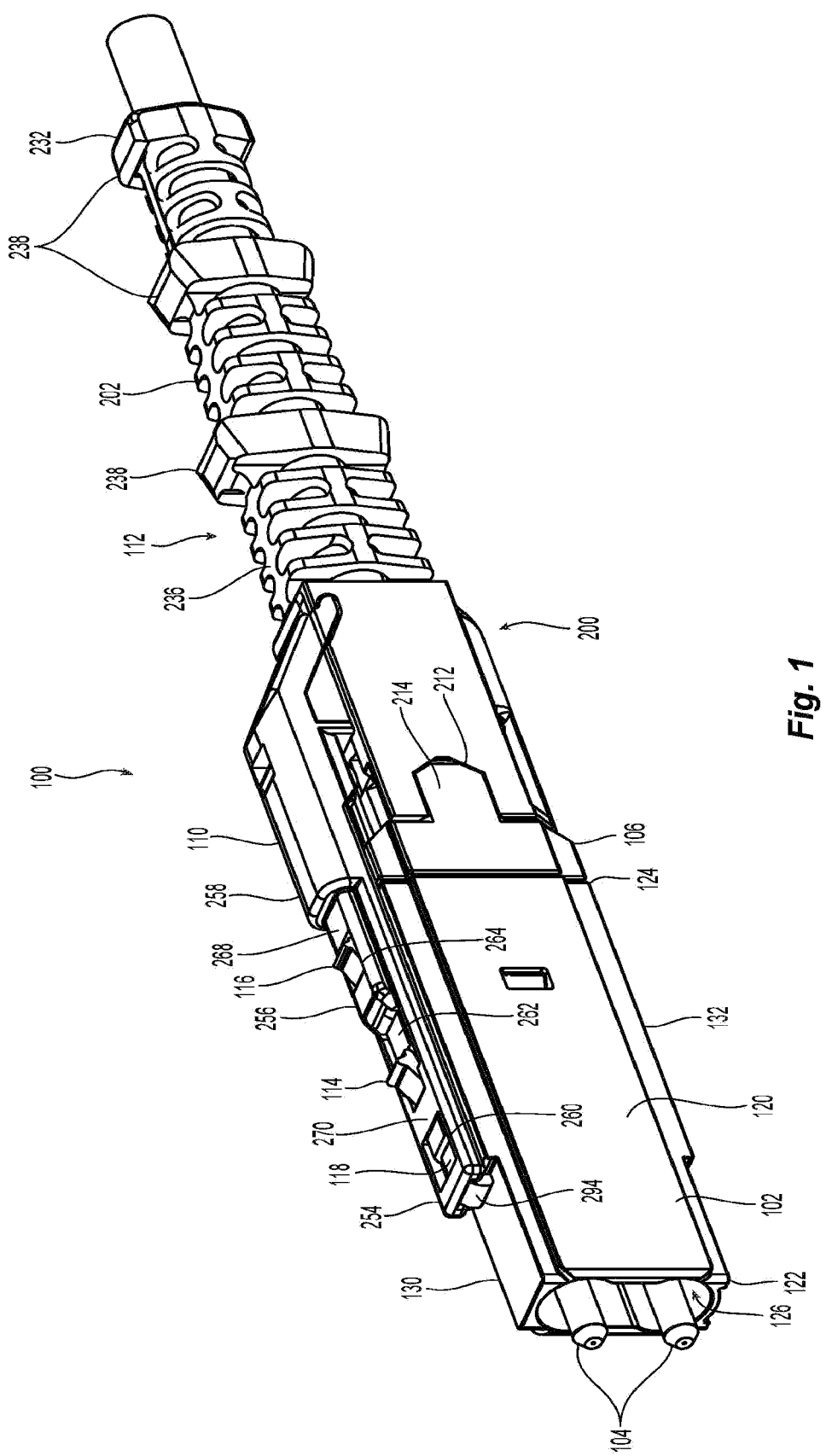
FIG. 1 is a top perspective view of one embodiment of a fiber optic connector with a crimp body, a boot, and a front extension according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Applicant notes that the term "front" or "forward" means that direction where the fiber optic connector would meet with another fiber optic connector or device, while the term "rear" or "rearward" is used to mean the direction from which the optical fibers enter into the fiber-optic ferrule or fiber optic connector. Thus, "front" is that part of the fiber optic connector on the left side of FIG. 1 and "forward" is out and to the left. "Rear" or "back" is that part of the fiber optic connector that is on the right side of the page and "rearward" and "backward" is toward the right.

One embodiment of a fiber optic connector 100 according to the present invention is illustrated in FIGS. 1-15. The fiber optic connector 100, as illustrated in FIGS. 1-6, may include a housing 102, fiber optic ferrules 104 (which may be included in a ferrule assembly as disclosed in PCT/2018/066523), a crimp body 106, a crimp ring and heat shrink tube 108, a front extension 110 that is a part of strain relief boot 112. As discussed in more detail below, the crimp body 106, the front extension 110, and a strain relief boot 112 are the focus of this application. The front extension 110 also functions as a push-pull mechanism or latch component, whereby the front extension 110 has at least one latch and more preferably two latches 114, 116 on a latch body 118 that engage a receptacle (such as an adapter and/or a carrier) if used with the present invention. The front extension 110 also functions as a polarity key for the fiber optic connector 100. As described in more detail below, the fiber optic connector 100 can only be inserted into a receptacle in one orientation with the front extension 110 installed on the fiber optic connector 100. The housing 102 is symmetric about a longitudinal axis A through the fiber optic connector 100. Thus, without the front extension 110, the fiber optic connector 100 could be inserted into a receptacle in at least two ways. The front extension 110 prevents the fiber optic connector 100 from being inserted in all but one way— thereby giving it a polarity function.

Turning to the housing 102, the housing 102 has a main body 120 extending between a front end 122 and a rear end 124, and has an opening 126 extending therebetween. See also FIGS. 6 and 7. The fiber optic ferrules 104 are disposed within the opening 126 and have their front faces (for mating with other fiber optic ferrules) adjacent the front end 122. The crimp body 106 is also at least partially disposed within the opening 126 at the rear end 124 of the housing 102.

The outside of the housing 102 has many features that are integral to its use. First are the top surface 130 and the bottom surface 132. The top and bottom surfaces 130,132 are preferably the same. Extending from the rear end 124 towards the front end 122 of the housing 102 on both the top surface 130 and the bottom surface 132 is a rail receiving portion 134. The rail receiving portion 134 as illustrated does not extend the entire length of the housing 102, but it could extend farther along the length of the housing 102 than shown in the figures if so desired. The rail receiving portion 134 has a stop surface 136 at the end of the rail receiving portion 134. The front extension 110 will make use of the stop surface 136 when the fiber optic connector 100 is inserted into or removed from various structures as discussed in more detail below.

The rail receiving portion 134 has a central portion 138 and two lobe sections 140, one lobe on each side of the central portion 138. As a result, the rail receiving portion 134 looks like part of a profile of a dog bone. This configuration matches that of the bottom surface of the front extension 110 (latch component or push-pull mechanism) to form a sliding dove-tail configuration. See FIG. 7. Other configurations are possible, such as, for example, a cap with undercuts (essentially an umbrella or a T-shape configuration).

The fiber optic connector 100 also includes a crimp body 106. The crimp body 106 has a front portion 150 that is designed to interact and connect with the housing 102 and a spring push (not shown) that is used in conjunction with the fiber optic ferrules 104 in the opening 126 thereof. The crimp body 106 has a central portion 152 that fits against the rear end 124 of the housing 102. The central portion 152 has a first portion 154 that includes a rail receiving portion 158 on both a top side 154 and a bottom side 156. The rail receiving portion 158 has a central portion 160 and two lobe sections 162, one lobe on each side of the central portion 160 that matches the same structure 134 on the housing 102 to engage the front extension 110.

The central portion 152 has a second, more rearward portion 170 that include two notches 172 on both the top side 154 and the bottom side 156. At a rearward end 174 of each of the four notches 172 (two on the top side 154 and two on the bottom side 156) are forward facing surfaces 176 to engage latches on the boot 112. The notches 172 and the forward facing surfaces 176 are involved in the connection of the boot 112 (and the front extension 110) to the crimp body 106 and the housing 102 as explained below.

The crimp body 106 has a rear portion 180 that extends behind the central portion 152 and the housing 102 and provides an outer surface 182 to receive a crimp band (e.g., crimp ring and heat shrink tube) therearound. Extending through the crimp body 106 is an opening 184 through which optical fibers/optical fiber cable can pass between the fiber optic ferrules 104 and the boot 112. Although the design will allow for the use of a crimp band to attach the aramid yarn from a fiber optic cable, the crimp band is optional and the fiber optic connector will work without a crimp band when the aramid yarn is not present. Further, when the crimp band is not used, the crimp body would require the outer surface 182.

Turning now to the boot 112, the boot 112 includes the front extension 110, a center portion 200 that is disposed between the front extension 110 and a ribbed back portion 202. It should be noted that the front extension 110 is preferably an integral part of the center portion 200, but it could be removably attached to the center portion 200 and still fall within the scope of the present invention.

The center portion 200 has a front end 204 and a back end 206 with a first longitudinal opening 208 extending throughout the center portion 200. The first longitudinal opening 208 receives at least a portion of the crimp body 106, including at least the rear portion 180 that extends behind the central portion 152 and the outer surface 182 with the crimp band. The first longitudinal opening 208 also receives the rearward portion 170 of the central portion 152 of the crimp body 106 as well as the notches 172 and the forward facing surfaces 176. See FIG. 9.

The center portion 200 also has sides 210 that help to define the first longitudinal opening 208. The sides 210 may also have cut-outs 212 that receive a portion 214 of the crimp body 106. The cooperation between the cut-outs 212 and the portion 214 of the crimp body 106 assist in alignment and the integrity of the combination of the crimp body 106 and the center portion 200. However, it should be noted that the sides 210 could be solid and cover the overlapping portion of the crimp body 106. See, e.g., FIG. 16.

Within the first longitudinal opening 208 and extending from the sides 210 are two projections or latches 220 that extend into the first longitudinal opening 208. When the boot 112 is attached to the crimp body 106, the projections or latches 220 are disposed within the two notches 172 on one of the top side 154 or bottom side 156, depending on the orientation of the boot 112. In the fully engaged position, the projections or latches 220 are farthest from the forward facing surfaces 176 that at least partially define the two notches 172. See FIG. 9. At this position, the front end 204 of the center portion 200 should be touching the first portion 154 of the central portion 152 of the crimp body 106. See FIGS. 1, 8, and 9. The center portion 200 also has a bridge portion 222 that connects the sides 210 with the projections or latches 220. This bridge portion 222 performs two functions. First, as seen in FIGS. 2 and 8, the bridge portion 222 blocks the rail receiving portion 158 when the front extension 110 is oriented on the other side of the fiber optic connector 100. See FIG. 8. This bridge portion 222 assists in preventing the rail receiving portion 158 from snagging optical fibers and optical fiber cables when the fiber optic connector 100 is installed. Second, when a user pushes on the bridge portion 222 toward the first longitudinal opening 208, the projections or latches 220 (and the sides 210) are pushed outward and clear of the notches 172 and the forward facing surfaces 176. This allows the boot 112 (and center portion 200) to be removed from the crimp body 106 and from the fiber optic connector 100 if so desired.

Figure 11:
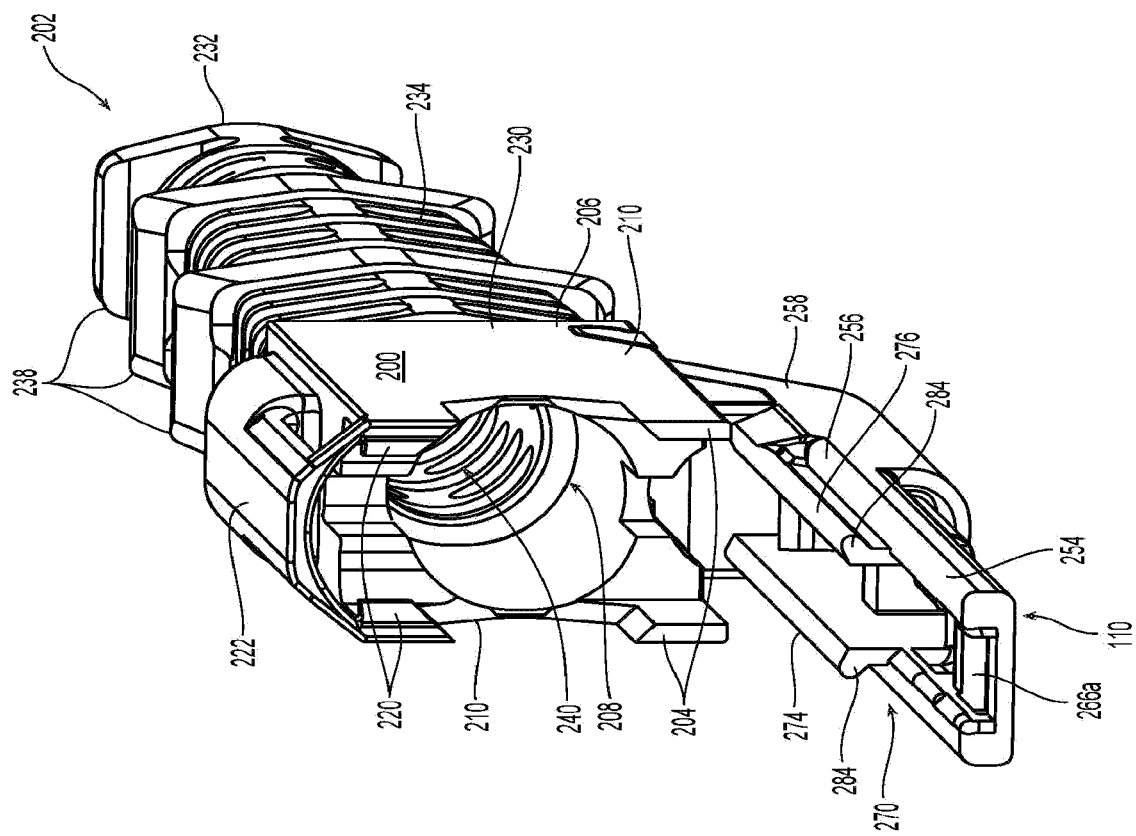
FIG. 11 is a bottom perspective view from the front of the boot and the front extension of the fiber optic connector in FIG. 1 down the opening therein.
Figure 12:
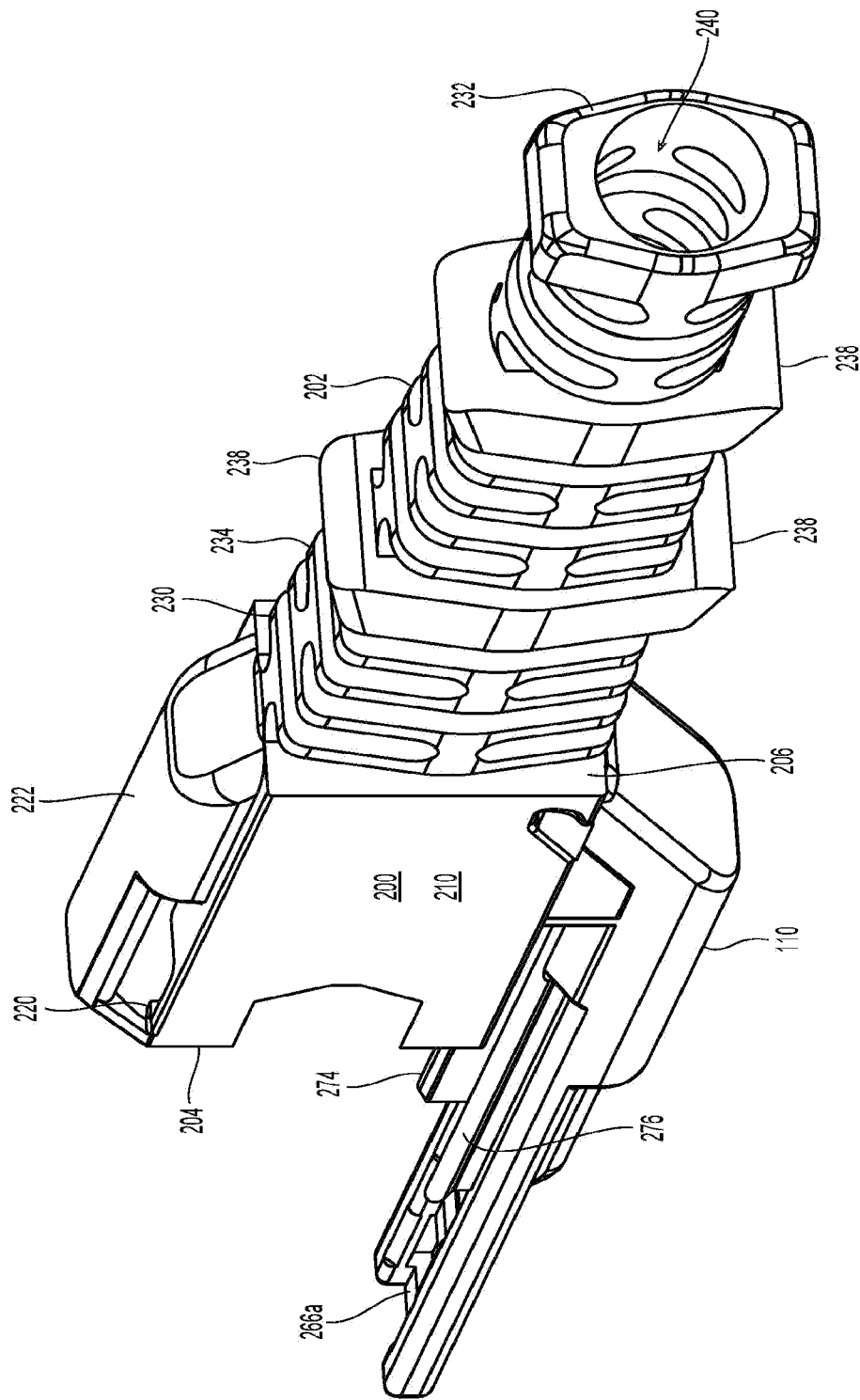
FIG. 12 is a rear and bottom perspective view of the boot and the front extension of the fiber optic connector in FIG. 1 down the opening therein.
Figure 13:
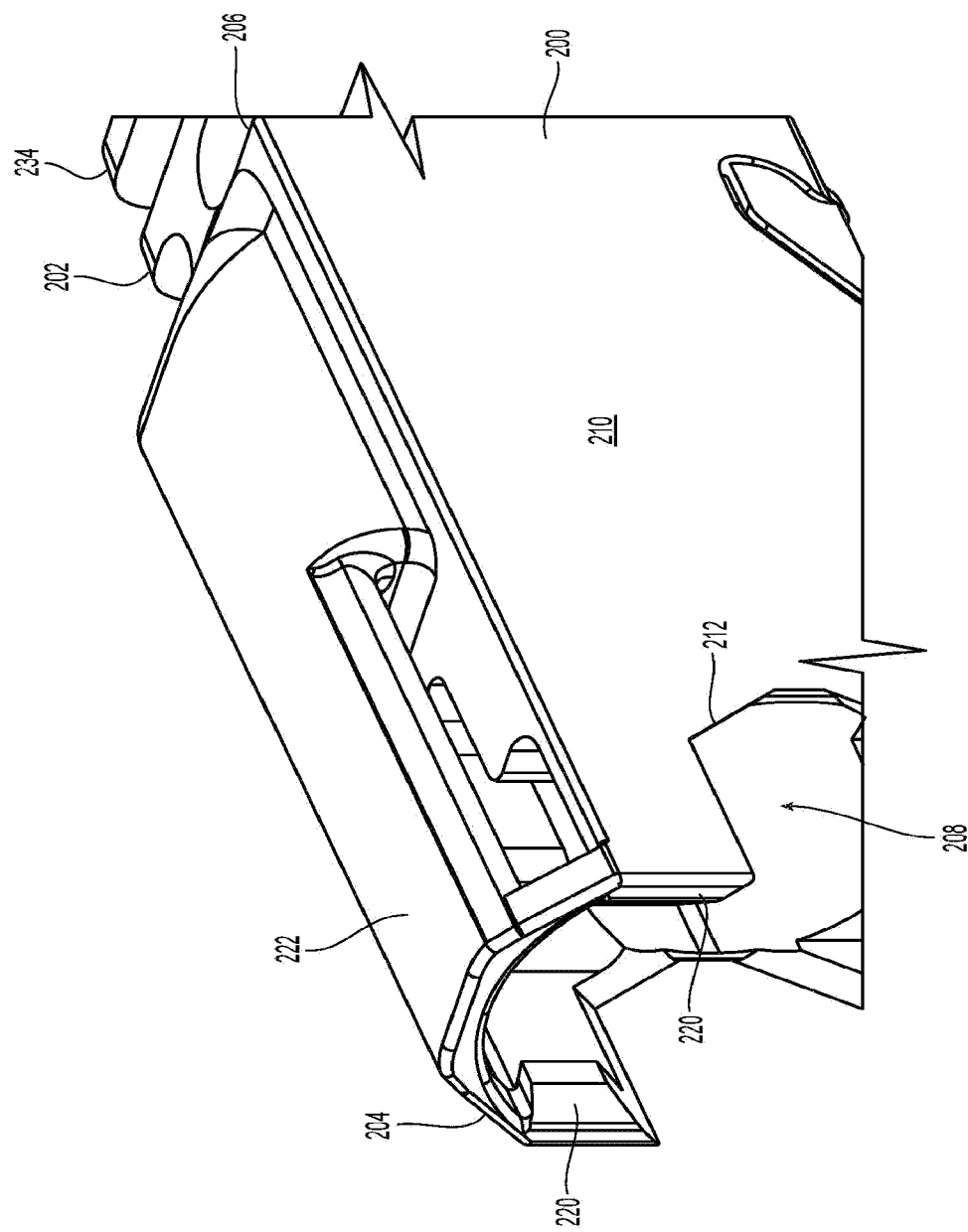
FIG. 13 is an enlarged view of a portion of the bottom portion of the boot.

It should be noted that while there are two projections or latches 220 and two notches 172 on each side, there may be more or fewer. For example, there may just be one latch and one corresponding notch. Alternatively, the latching of the boot 112 to the crimp body 106 may not be on an outside surface of the crimp body 106. Instead, such latching may occur on an inside surface of the crimp body 106, and may not be visible from the outside. For example, the notches 172 and the forward facing surfaces 176 may be inside the rearward portion 170 such that from outside, the rearward portion 170 will have a smooth continuous surface merging with the portion 214 of the crimp body. In another example, latches 220 may be extending from the bridge portion 222 into an internal groove inside or underneath the top surface of the rearward portion 170 (i.e., the portion between the forward facing surfaces 176). In this scenario, the latches 220 would be facing upward or downward rather than sideways as shown in FIG. 11, for example.

The ribbed back portion 202 extends between a front end 230 and a back end 232 and is made of a plurality of rib members 234. The ribbed back portion 202 is attached to the back end 206 of the center portion 200 and extends away from the front end 204. Thus, the ribbed back portion 202 makes the boot 112 longer. The ribbed back portion 202 also has a spine 236 that joins the plurality of rib members 234 together. Along the spine 236 are a number of grasping portions 238 that provide surfaces for the user to grasp. The user can then use the ribbed back portion 202 to either push the fiber optic connector 100 into a receptacle or to pull on the ribbed back portion 202, and the grasping portions 238 in particular, to pull the fiber optic connector 100 from a receptacle. The grasping portions 238 are illustrated as three annular members that are disposed along a length of the spine 236 and together with the plurality of rib members 234 form a second longitudinal opening 240 through the ribbed back portion 202. The first longitudinal opening 208 and the second longitudinal opening 240 are in communication with one another and form a pathway for the optical fibers/fiber optic cable to be inserted from back end 232 to the opening 126 in the housing so they can be fixed within the fiber optic ferrules 102 in the fiber optic connector 100.

The construction of the ribbed back portion 202 with the plurality of rib members 234 and the spine 236 provides sufficient strength to allow it to be used to install and remove the fiber optic connector while at the same time being flexible to provide strain relief to the optical fibers. The ribbed back portion 202 is illustrated as being asymmetrical about the second longitudinal opening 240, but could be of any appropriate shape and still fall within the scope of the present invention. Additionally, there could different rib structures and grasping portions such as those illustrated in FIGS. 16 and 17 that also fall within the scope of the present invention.

The front extension 110 has a main body 250 and a latch body 118 that attaches to the main body 250. See FIGS. 6, 7, and 14. The main body 250 has a front portion 254, a middle portion 256, and a rear portion 258. Generally, the front portion 254 is where the latch body 252 attaches to the main body 250 and provides for the latching of the fiber optic connector 100 to a first receptacle such as an adapter. The middle portion 256 provides an area for the latching of the fiber optic connector 100 to a second receptacle such as a ganged carrier. The rear portion 258 has an area for a return element associated with the latch body 252 and also connects the front extension 110 to the center portion 200 of the boot 112.

The front portion 254 has two windows 260 and 262 and the middle portion 256 has a window 264. The window 262 of the front portion 254 and window 264 are to receive a latch 114, 116 from the latch body 118 therethrough. The first window 260 is to receive a latch pad 266 on the latch body 118. There are two latch 266 pads on the latch body 118 that cooperate with a groove 266a in the main body 250 to secure the latch body to the main body 250. The latch pads slide within the grooves to allow for the latching and unlatching the fiber optic connector 100. A more detailed discussion of this feature is disclosed in PCT/2018/066523, which is incorporated by reference herein.

The middle portion 256 has an upper surface 268 that is higher than an upper surface 270 of the front portion 254. This allows for the latching of a carrier and an adapter with the same device. On the bottom side 272 of the middle portion 256 are two extensions 274,276 that are a complementary configuration of a rail receiving portion 134 of the housing 102. See FIG. 13. The latch body 118 also has the same rail portion configuration of two extensions 280,282 on the bottom thereof. This allows the main body 250 and the latch body 118 to be slidingly attached to the rail receiving portion 134 of the housing 102 and the rail receiving portion 158 of the crimp body 106. When the latch body 118 is inserted into the front portion 254, a front surface 284 of the two extensions 274,276 provides a pushing surface by which the main body 250 can push the latch body 118 in the rail receiving portion 134. See also FIGS. 11 and 14. The front surface 286 of the two extensions 280,282 also provides a pushing surface to be used against the stop surface 136 of the housing 102. See FIGS. 11 and 14. This allows for the user to exert a force on the boot 112 which is transferred through the main body 250 to the latch body 118 and to the housing 102 to insert the fiber optic connector 100 into a carrier and/or adapter.

Figure 2:
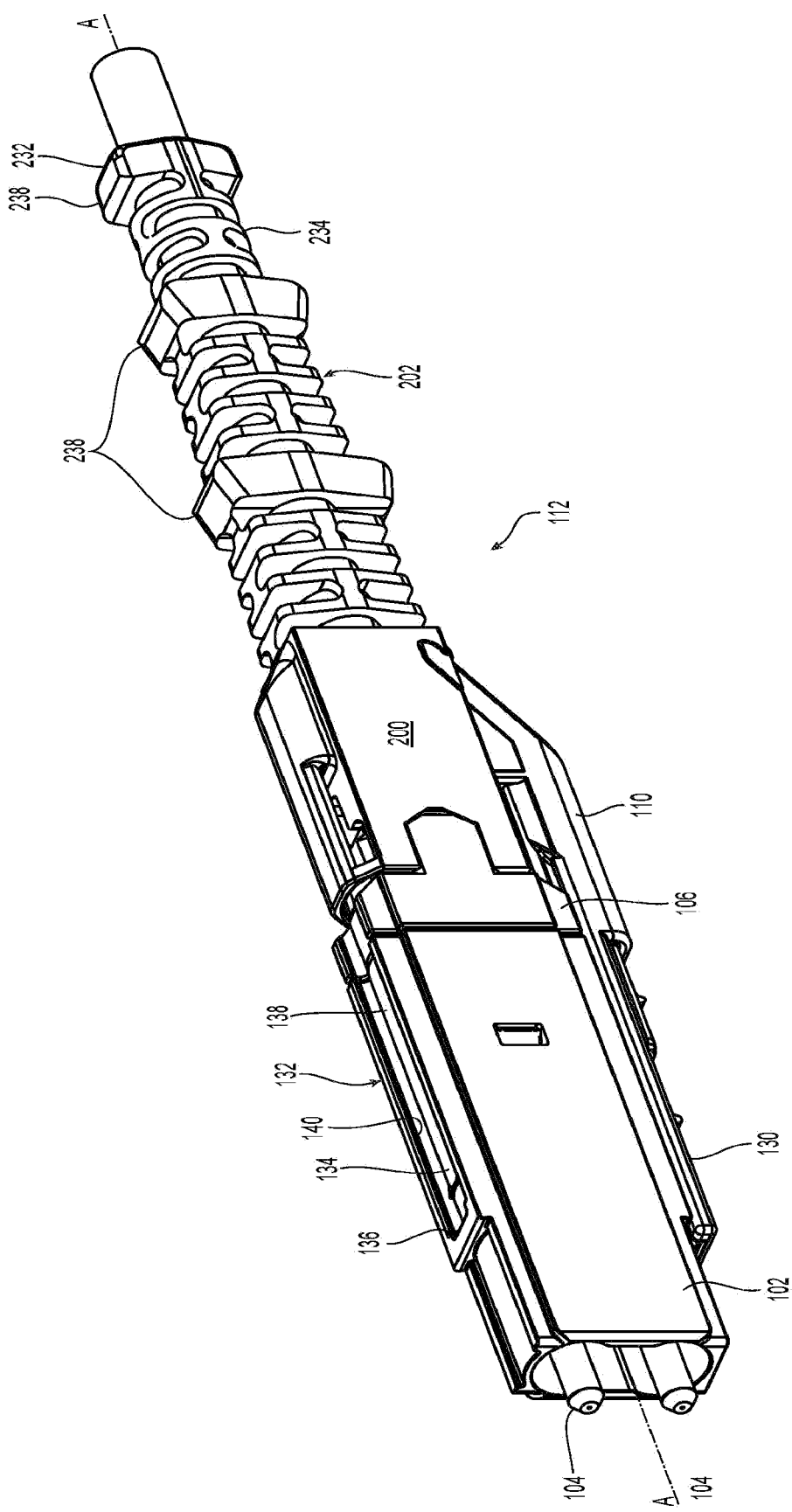
FIG. 2 is a bottom perspective view of the fiber optic connector in FIG. 1.
Figure 3:
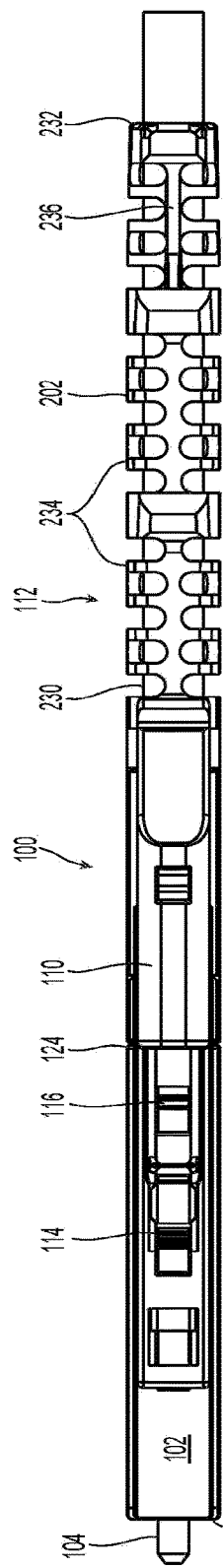
FIG. 3 is a top plan view of the fiber optic connector in FIG. 1.
Figure 4:
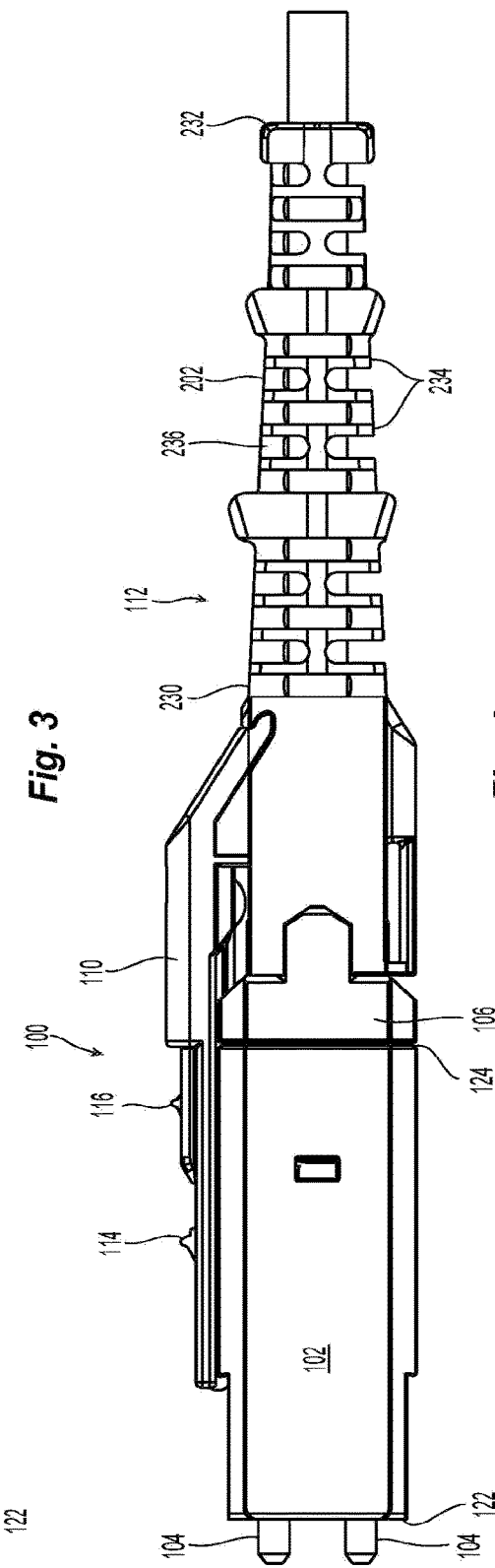
FIG. 4 is a side elevation view of the fiber optic connector in FIG. 1.
Figure 5:
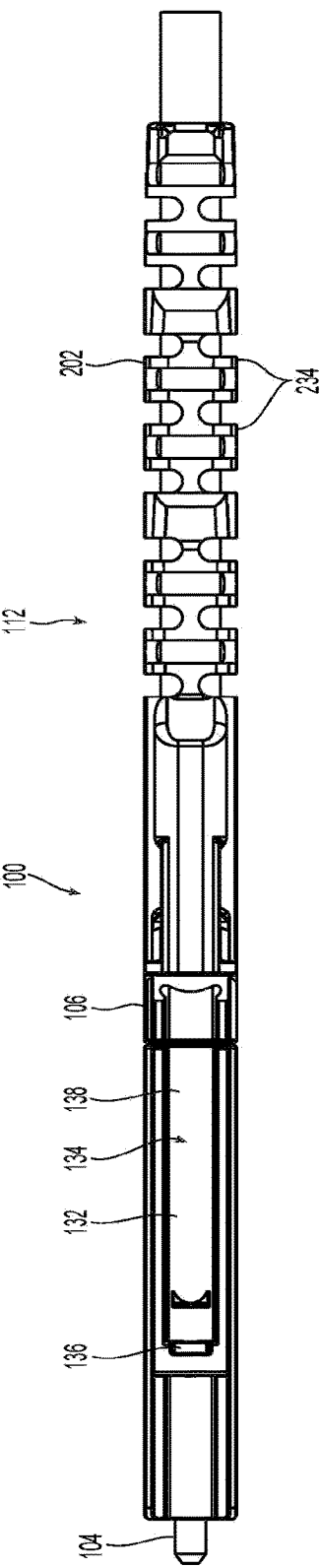
FIG. 5 is a bottom plan view of the fiber optic connector in FIG. 1.
Figure 7:
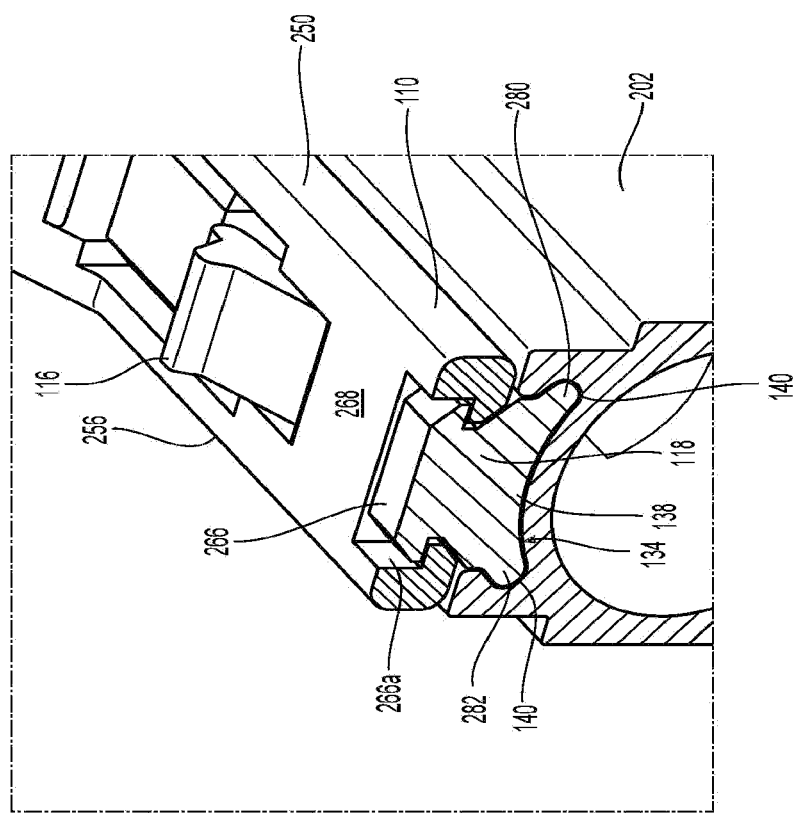
FIG. 7 is a cross sectional view of the front extension, latch body, and connector housing.
Figure 10:
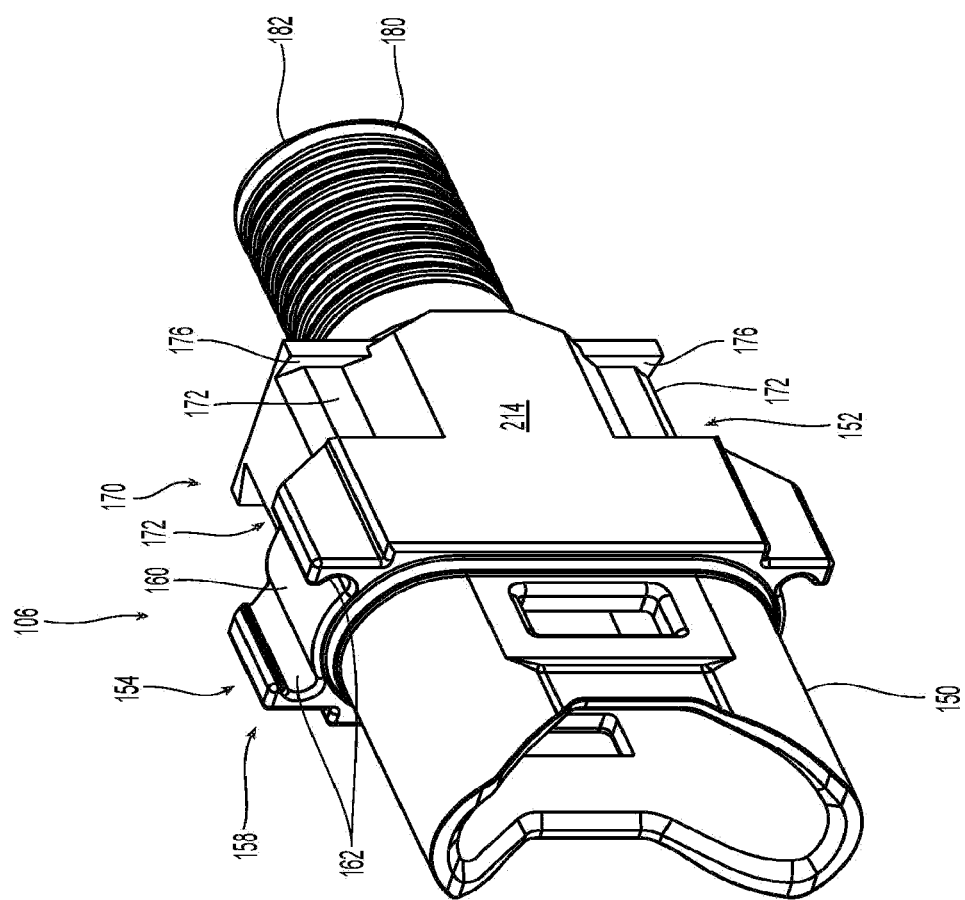
FIG. 10 is perspective view of the crimp body of the fiber optic connector in FIG. 1.
Figure 14:
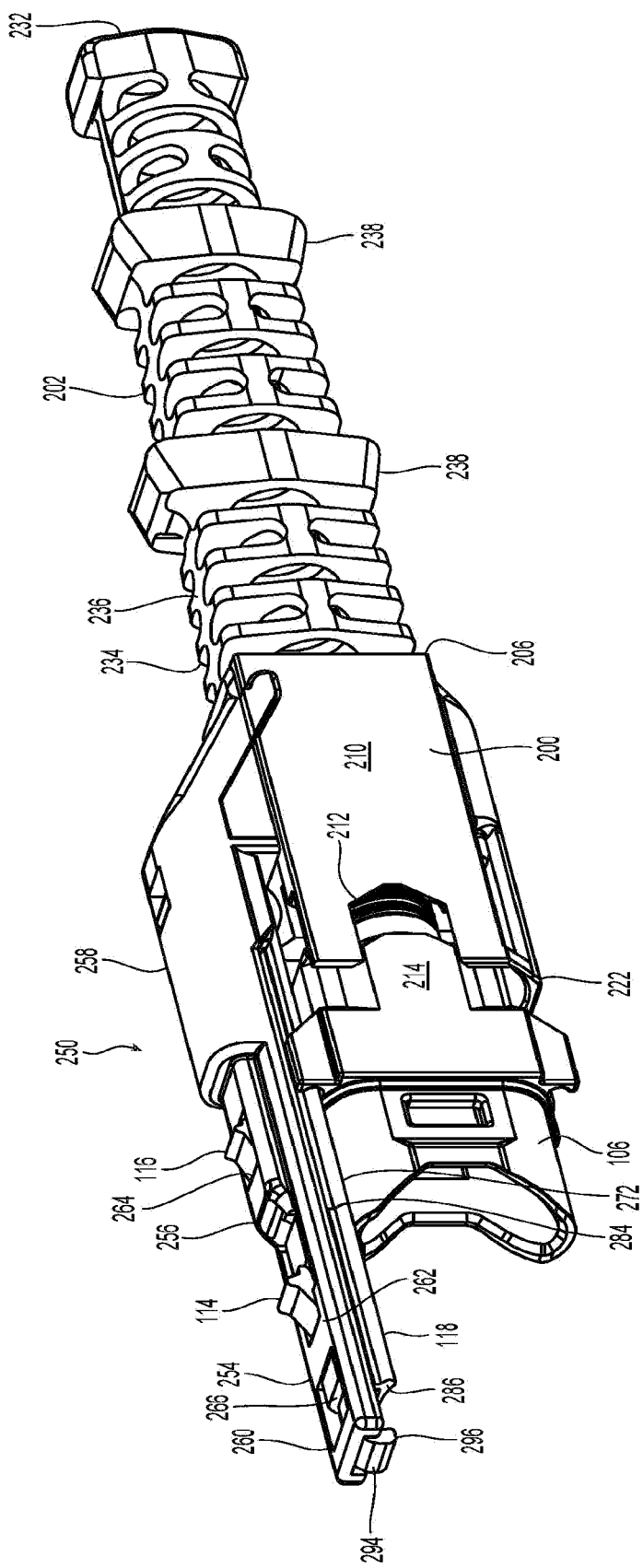
FIG. 14 is a side perspective view of the boot and front extension being attached to the crimp body.

Turning to FIGS. 1, 7, and 14, the latch body 118 has two latches for receptacles such as an adapter latch 114 and a carrier latch 116. The latch body 118 may only have one of the latches, depending upon its uses and the needs of the user and the receptacles into which the fiber optic connector 100 is going to be inserted. The adapter latch 290 extends from a forward portion of the latch body 118 and protrudes through window 262 of the main body 250. The carrier latch 116 also extends from the latch body 118, from a rear portion thereof, and protrudes through the window 264 of the main body 250. As is recognized from FIG. 4, the adapter latch 114 does not rise as high as the carrier latch 116. The latch body 118 has a connector latch 294 as well. The connector latch 294 extends forward beyond the front surface 286 of the two extensions 280,282 to engage the stop surface 136. The connector latch 294 has a downward curling portion 296 that provides a surface to engage the stop surface 136 to prevent the latch body 118 from moving rearwardly relative to the housing 102 as the boot 112 is pulled to disengage the fiber optic connector 100 from a receptacle as will now be explained.

Figure 6:
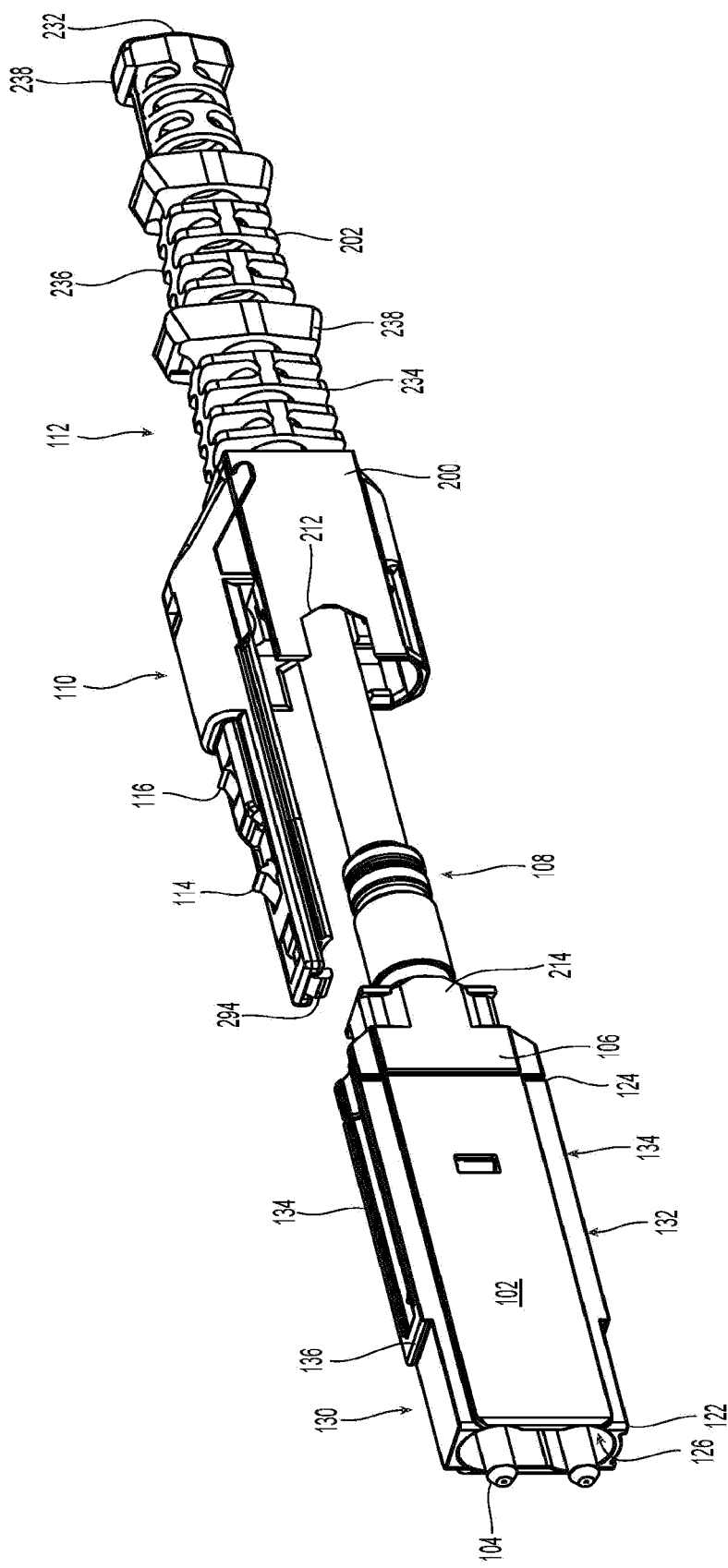
FIG. 6 is a front perspective view of the fiber optic connector in FIG. 1 with the boot and front extension detached from the crimp body and the connector housing.

Referring in particular to FIGS. 1, 6, 9, 14, and 15, the attachment, use, and the removal of the boot 112 on the fiber optic connector 100 will be explained. As is generally known in the art, a fiber optic connector would need to have the optical fibers terminated in the fiber optic ferrules before a strain-relief boot can be attached to the fiber optic connector. In this case, the boot 112 with the center portion 200 and the front extension 110 are put onto the optical fibers/fiber optic cable as illustrated in FIG. 6. The optical fibers/fiber optic cable pass through the first longitudinal opening 208 and the second longitudinal opening 240 of the boot 112 and are secured in the fiber optic ferrules 104. The jacket or covering on the optical fibers/fiber optic cable is then secured to the crimp body 106 with a crimp ring and heat shrink tube 108 or in any other manner that is appropriate. As seen in FIG. 6, the boot 112 is disposed on the optical fibers/fiber optic cable and the fiber optic connector has been assembled. As the boot 112 is moved to the fiber optic connector (to the left in FIG. 6), it is apparent that the front extension 110 will engage the rail receiving portion 158 of the crimp body 106 first and then the rail receiving portion 134 of the housing 102. As the boot 112 is further pushed to the left in the figure, the rear portion 180 of the crimp body 106 enters the first longitudinal opening 208 followed by the rearward portion 170 of the central portion 152 of the crimp body 106. As the connector latch 294 starts to engage the stop surface 136 of the housing 102, the notches 172 and the forward facing surfaces 176 of the central portion 152 of the crimp body 106 also enter the first longitudinal opening 208. See FIG. 1. FIG. 14 also illustrates (with the connector housing 102 removed for clarity) how the crimp body 106 engages the boot 112 and the latches 220 moving past the forward facing surfaces 176. With the front end 204 of the center portion 200 disposed against the crimp body 106, the cut-outs 212 receive the portion 214 of the crimp body 106. As seen in FIG. 9, the projections or latches 220 are disposed within the two notches 172 and are at the front end of the notches 172. At this point, the fiber optic connector 100 is as illustrated in FIGS. 1-5 and ready to be inserted into a receptacle. The user could push on the ribbed back portion 202, the grasping portions 238, the front extension 110, or the center portion 200 to insert the fiber optic connector 100 into the receptacle.

Figure 15:
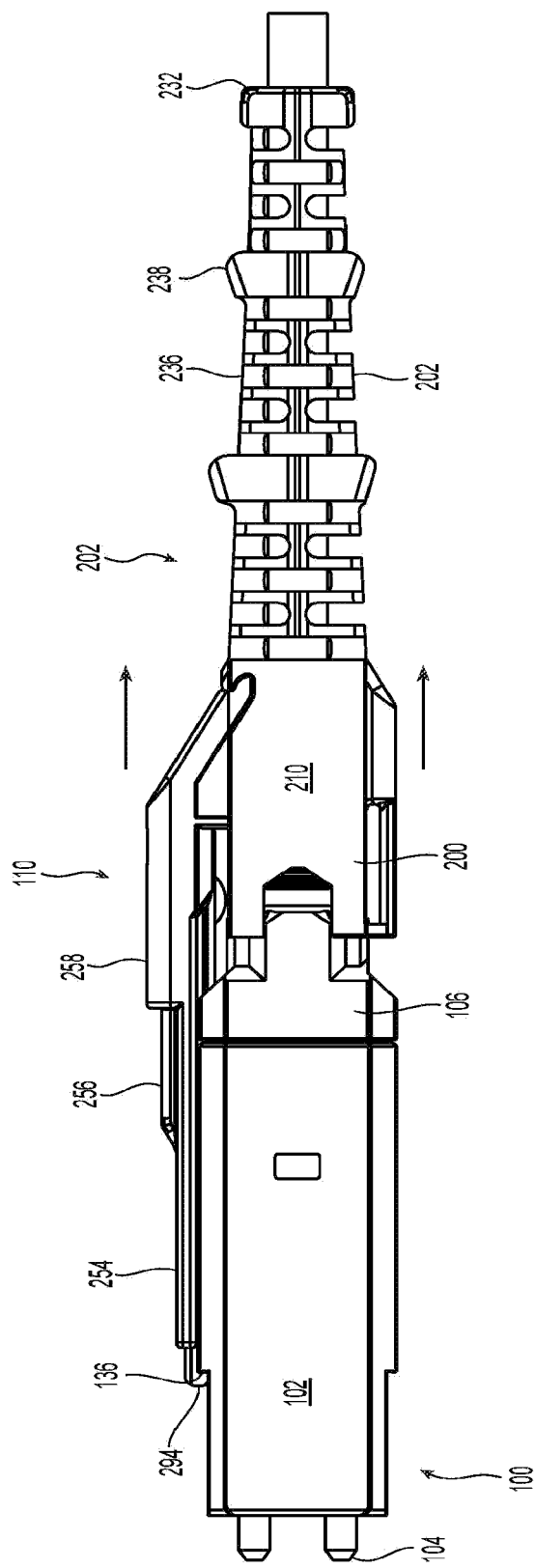
FIG. 15 is a side view of the boot and the front extension being pulled rearwardly to disengage the fiber optic connector from a receptacle.

To remove the fiber optic connector 100 from the receptacle, the user could pull on the ribbed back portion 202, the grasping portions 238, the front extension 110, or the center portion 200. Referring to FIG. 15, when the user pulls on one of those structures, the front extension 110, the center portion 200, and ribbed back portion 202 move relative to the crimp body 106 and the housing 102, the projections or latches 220 sliding rearwardly within the two notches 172. It is important to note that the frictional force between the boot and the connector housing and crimp body should be low. It is desirable to have clearance between the boot and the crimp band, crimp body, housing, and the cable. It is also desirable to have a boot material that has a low coefficient of friction, such as polypropylene. Furthermore, a elastomeric boot material is not preferred because the user could deform the internal surface of the boot and cause added friction due to squeezing or pinching the boot while pulling. A material with a Young's Modulus greater than 500 MPa or possibly greater than 1 GPa has been shown not deform easily. See the arrows in FIG. 15. It is important to note that the latch body 118 (and the adapter latch 114 and carrier latch 116) also does not move because the connector latch 294 has engaged the stop surface 136 of the housing 102. As the front extension 110 moves rearwardly, the main body 250 slides relative to the latch body 118 (and housing 102), pushing the adapter latch 114 and carrier latch 116 downward out of the windows and disengaging them from their respective receptacle.

At this point the fiber optic connector 100 could be simply removed from the receptacle by pulling on the ribbed back portion 202, the grasping portions 238, the front extension 110, or the center portion 200. The engagement of the projections or latches 220 with the forward facing surfaces 176 prevents the boot 112 from being disengaged from the crimp body 106 and the housing 102. However, as noted above, the user could push on the bridge portion 222, which allows the boot 112 to be disengaged from the crimp body 106 and the housing 102. At this point the boot 112 could be rotated about the optical fibers/fiber optic cable and reattached on the opposite side, thereby changing the polarity of the fiber optic connector 100.

Figure 16:
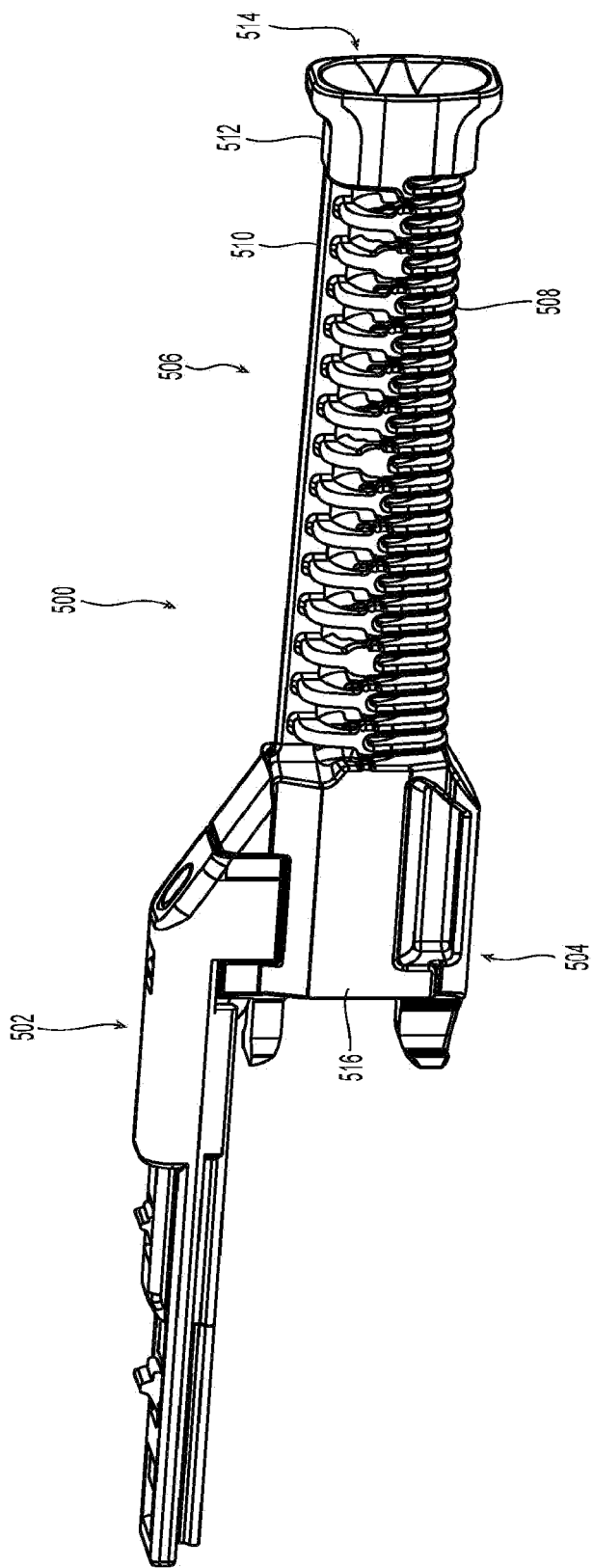
FIG. 16 is a second embodiment of a fiber optic connector with a crimp body, a boot, and a front extension according to the present invention.
Figure 17:
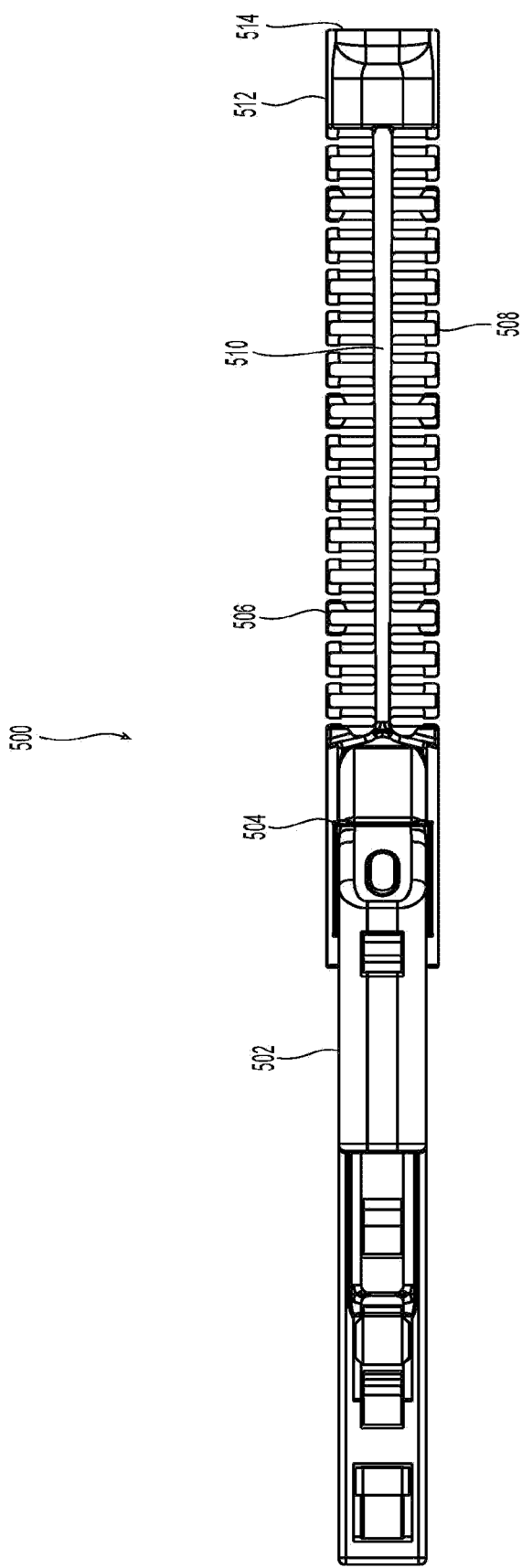
FIG. 17 is a third embodiment of fiber optic connector with a crimp body, a boot, and a front extension according to the present invention.
Figure 18:
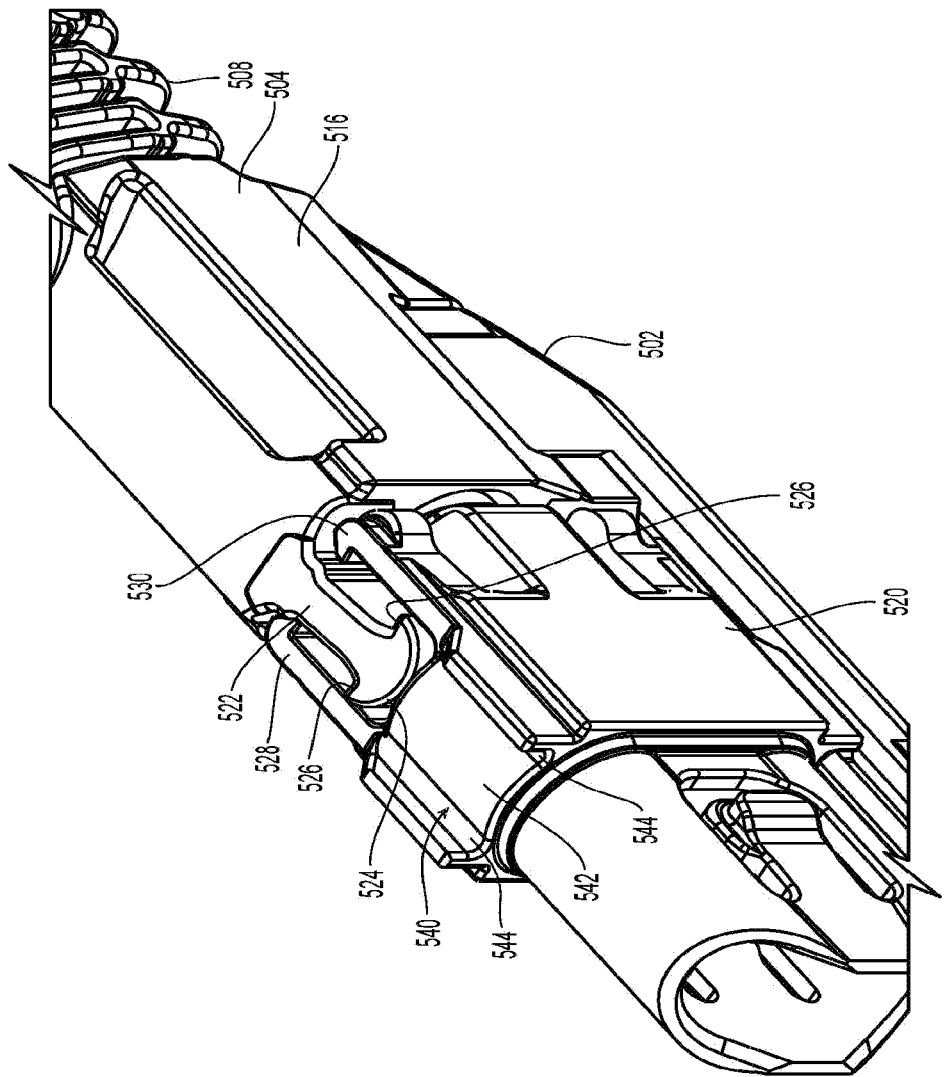
FIG. 18 is an enlarged view of the connection between the boot and the crimp body in the fiber optic connecter of FIG. 16.

FIGS. 16-18 illustrates another embodiment of a boot 500 for use with a fiber optic connector. The boot 500 has a front extension 502, a center portion 504, and a ribbed back portion 506. The front extension 502 of this embodiment is the same as that described above and will not be addressed any further. The ribbed back portion 506 functions in the same way as ribbed back portion 202 in that it can be used to push and pull on the fiber optic connector. It does have a different configuration with regard to the plurality of rib members 508 and the spine 510, but still provides sufficient strength to allow it to be used to install and remove the fiber optic connector while at the same time being flexible to provide strain relief to the optical fibers. The ribbed back portion 506 has only a single grasping portion 512 at the back end 514, although more grasping portions could be added. As can be seen in the figures, the spine 510 connects the plurality of rib members 508 from the center portion 504 to the grasping portion 512.

The center portion 504 of the boot 500 is similar to the embodiment above, but with a few differences. First, the sides 516 that help to define the longitudinal opening therein do not have cut-outs. The sides of a crimp body 520 to be used with the boot 500 would not have to extend as far into the center portion with the engagement member noted below.

Second, the way of engagement between the center portion 500 and the crimp body 520 has changed. See FIG. 18. In this figure, the top and bottom of the center portion 500 have a single engagement member, a single element 522 that replaces the two projections or latches 220 in the prior embodiment. The single element 522 has a shape that is rounded at the front 524 and then has two rearward facing surfaces 526 to engage two inward facing latches 528, 530 in the crimp body 520. The interaction between the center portion 504 and the crimp body 520 is the same as discussed above. The boot 500 is advanced toward the crimp body 520 and the rounded front portion 524 causes the two inward facing latches 528, 530 in the crimp body 520 to spread apart, allowing the engagement member 522 to be disposed between them. As the user pulls on the boot 500 to remove the fiber optic connector from a receptacle, the engagement member 522 moves relative to the two inward facing latches 528, 530. As discussed above, this movement causes the front extension 502 to release the latches and the engagement member 522 contacts the two inward facing latches 528, 530 to pull the fiber optic connector from the receptacle. Once the fiber optic ferrule is removed from the receptacle, the user can pull of the center portion 504 while holding the crimp body or housing and disengage the boot 500 from the crimp body with a little more force than was necessary to disengage the fiber optic connector from the receptacle.

One other alternative in this embodiment that can be used on the other embodiment is the rail receiving portion 540 on both sides. The rail receiving portion 540 has a central portion 542 and two lobe sections 544 to engage the front extension 502. However, the lobe sections 542 not as closed as the two lobe sections 162. This allows the rail receiving portion 540 to act more as an alignment feature allowing the front extension 502 to be aligned with and then inserted in to the rail receiving portion 540 from above it, rather than being inserted from the rear side as in the prior embodiment.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed:

1. A boot for a fiber optic connector, the fiber optic connector having a housing supporting at least two optical fibers, and a crimp body, the boot comprising:
    a center portion having a front end and a back end, a first longitudinal opening extending between the front end and the back end of the center portion;
    a back portion attached to the center portion and extending away from the front end of the center portion, the back portion defining a second longitudinal opening that is in communication with the first longitudinal opening; and
    a front extension portion connected to the center portion and extending forward and beyond the front end of the center portion, the housing of the fiber optic connector having a pair of short sides forming a top and a bottom and a pair of long sides joining the top and the bottom, the at least two optical fibers spaced apart between the top and the bottom formed by the pair of short sides,
    wherein the boot is movable longitudinally relative to the housing upon application of a pull force, and wherein after application of the pull force, the boot and the housing are rotatable relative to each other to change a polarity of the fiber optic connector,
    wherein a separation between the top and the bottom of the housing is more than a separation between each of the pair of long sides,
    wherein the at least two optical fibers are positioned inside the back portion and are surrounded by a cable jacket,
    wherein a connection of the boot to the housing in a first relative orientation determines a first polarity of the fiber optic connector and a connection of the boot to the housing in a second relative orientation determines a second polarity of the fiber optic connector, and
    wherein the first relative orientation and the second relative orientation differ by 180° about a longitudinal axis of the fiber optic connector.

2. The boot of claim 1, wherein a portion of the crimp body and a fiber optic cable having the at least two optical fibers are positioned in the first longitudinal opening.

3. The boot of claim 1, wherein the front extension portion has at least one latch to engage a receptacle.

4. The boot of claim 1, wherein the center portion engages a rear portion of the housing at the top and the bottom of the housing.

5. The boot of claim 1, wherein the at least two optical fibers include exactly two optical fibers.

6. The boot of claim 5, wherein the exactly two optical fibers are respectively supported by two fiber optic ferrules inside the housing and forward of the boot.

7. The boot of claim 1, wherein the boot has a back portion having at least one grasping portion to allow a user to push and pull on the boot.

8. The boot of claim 1, wherein the front extension has two latches separated from each other.

9. The boot of claim 1, wherein the boot is slidable relative to the housing.

10. The boot of claim 1, wherein the front extension is an integral part of the center portion.

11. The boot of claim 1, wherein the front extension is removably attached to the center portion.

12. The boot of claim 1, wherein the center portion has sides with cutouts.

13. The boot of claim 1, wherein a material of the boot has a Young's modulus greater than 500MPa.

14. A method of changing polarity of a fiber optic connector having a housing supporting at least two optical fibers, a crimp body and a boot, the method comprising:
 separating the housing and the boot by applying an axial force between the housing and the boot, the boot having a front extension connected to a center portion of the boot and extending forward and beyond the front end of the center portion;
 rotating relatively the housing and the boot by 180°; and
 attaching the relatively rotated boot and the housing to each other,
 wherein the center portion of the boot engages a rear end of the housing, a first longitudinal opening of the center portion extending between the front end and a back end thereof to receive a portion of the crimp body and a fiber optic cable having the at least two optical fibers,
 wherein the boot has a back portion attached to the center portion and extending away from the front end of the center portion, the back portion defining a second longitudinal opening that is in communication with the first longitudinal opening, and
 wherein a polarity of the fiber optic connector is changed by the attaching the relatively rotated boot and the housing to each other after the rotating.

15. The method of claim 14, wherein the attaching comprises sliding the boot relative to the housing along a longitudinal axis of the fiber optic connector.

16. A boot for a fiber optic connector, the fiber optic connector having a housing supporting two optical fibers in respective two fiber optic ferrules, and a crimp body, the boot comprising:
 a center portion having a front end and a back end, a first longitudinal opening extending between the front end and the back end of the center portion;
 a back portion attached to the center portion and extending away from the front end of the center portion, the back portion defining a second longitudinal opening that is in communication with the first longitudinal opening, the second longitudinal opening supporting a fiber optic cable; and
 a front extension portion connected to the center portion and extending forward and beyond the front end of the center portion and having at least one projection to engage the housing,
 wherein the center portion engages a rear portion of the housing, the housing of the fiber optic connector having a pair of short sides forming a top and a bottom and a pair of long sides joining the top and the bottom, the two optical fibers spaced apart between the top and the bottom formed by the pair of short sides,
 wherein the boot is movable longitudinally relative to the housing upon application of a pull force, and wherein after application of the pull force, the boot and the housing are rotatable relative to each other to change a polarity of the fiber optic connector, and
 wherein a connection of the boot to the housing in a first relative orientation determines a first polarity of the fiber optic connector and a connection of the boot to the housing in a second relative orientation determines a second polarity of the fiber optic connector.

17. The boot of claim 16, wherein a portion of the crimp body and the fiber optic cable having the two optical fibers are positioned in the first longitudinal opening.

18. The boot of claim 16, wherein the first relative orientation and the second relative orientation differ by 180° about a longitudinal axis of the fiber optic connector.

19. The boot of claim 16, wherein a separation between the top and the bottom of the housing is more than a separation between each of the pair of long sides.

20. A push-pull boot for a fiber optic connector, the fiber optic connector having a housing supporting optical fibers, and a crimp body, the boot comprising:
 a center portion having a front end and a back end, a first longitudinal opening extending between the front end and the back end of the center portion;
 a back portion attached to the center portion and extending away from the front end of the center portion, the back portion defining a second longitudinal opening that is in communication with the first longitudinal opening, the second longitudinal opening supporting a fiber optic cable having the optical fibers; and
 a front extension portion connected to the center portion and extending forward and beyond the front end of the center portion and having at least one projection to engage the housing,
 wherein the center portion engages a rear portion of the housing, the housing of the fiber optic connector having a pair of short sides forming a top and a bottom and a pair of long sides joining the top and the bottom, the optical fibers spaced apart between the top and the bottom formed by the pair of short sides,
 wherein the boot is movable longitudinally relative to the housing upon application of a pull force, and wherein after application of the pull force, the boot and the housing are rotatable relative to each other to change a polarity of the fiber optic connector, and
 wherein a connection of the boot to the housing in a first relative orientation determines a first polarity of the fiber optic connector and a connection of the boot to the housing in a second relative orientation determines a second polarity of the fiber optic connector, the boot being 180° rotated about a longitudinal axis of the fiber optic connector between the first relative orientation and the second relative orientation.

* * * * *